US008355726B2

(12) United States Patent
Claussen et al.

(10) Patent No.: US 8,355,726 B2
(45) Date of Patent: Jan. 15, 2013

(54) DEVICE FOR FACILITATING OVERLAY NETWORK OPERATION IN AN UNDERLAY NETWORK ENVIRONMENT

(75) Inventors: Holger Claussen, Swindon (GB); Lester Tse Wee Ho, Swindon (GB); Louis Gwyn Samuel, Swindon (GB)

(73) Assignee: Alcatel Lucent, Paris (FR)

( * ) Notice: Subject to any disclaimer, the term of this patent is extended or adjusted under 35 U.S.C. 154(b) by 1361 days.

(21) Appl. No.: 11/613,270

(22) Filed: Dec. 20, 2006

(65) Prior Publication Data

US 2008/0153411 A1 Jun. 26, 2008

(51) Int. Cl.
*H04W 36/00* (2009.01)

(52) U.S. Cl. ........ 455/444; 455/436; 455/437; 455/438; 455/439; 455/442; 455/403; 455/525; 455/458; 370/331

(58) Field of Classification Search ............... 370/395.2, 370/395.52, 331; 455/403, 3, 444, 525, 458, 455/437, 438, 439
See application file for complete search history.

(56) References Cited

U.S. PATENT DOCUMENTS

| | | | | |
|---|---|---|---|---|
| 6,985,931 | B2 * | 1/2006 | Dowling | 709/217 |
| 7,020,474 | B2 * | 3/2006 | Scott | 455/456.1 |
| 2003/0115261 | A1 * | 6/2003 | Mohammed | 709/203 |
| 2005/0148368 | A1 | 7/2005 | Scheinert et al. | |
| 2007/0097939 | A1 * | 5/2007 | Nylander et al. | 370/338 |
| 2007/0097983 | A1 * | 5/2007 | Nylander et al. | 370/395.2 |
| 2007/0105527 | A1 * | 5/2007 | Nylander et al. | 455/403 |
| 2007/0105568 | A1 * | 5/2007 | Nylander et al. | 455/458 |
| 2007/0155421 | A1 * | 7/2007 | Alberth et al. | 455/553.1 |
| 2007/0213066 | A1 | 9/2007 | Claussen et al. | |
| 2007/0213086 | A1 | 9/2007 | Claussen et al. | |
| 2007/0254620 | A1 * | 11/2007 | Lindqvist et al. | 455/403 |
| 2007/0270151 | A1 | 11/2007 | Claussen et al. | |
| 2008/0013477 | A1 * | 1/2008 | Claussen et al. | 370/328 |
| 2008/0085691 | A1 * | 4/2008 | Harvey et al. | 455/187.1 |

OTHER PUBLICATIONS

U.S. Appl. No. 11/615,027, filed Dec. 22, 2006.
U.S. Appl. No. 11/611,916, filed Dec. 18, 2006.
3GPP TS 43.318 V6.5.0 (Jan. 2006) 3rd Generation Partnership Project; Technical Specification Group GSM/EDGE Radio Access Netowrk; Generic access to the A/Gb interface; Stage 2 (Release 6), pp. 1-70.
International Search Report and Written Opinion of the International Searching Authority for International application No. PCT/US2007/025212 mailed May 8, 2008.
International Preliminary Report on Patentability for International application No. PCT/US2007/025212 mailed Nov. 24, 2008.

* cited by examiner

*Primary Examiner* — Kamran Afshar
*Assistant Examiner* — Khalid Shaheed
(74) *Attorney, Agent, or Firm* — Carlson, Gaskey & Olds PC

(57) ABSTRACT

A wireless communication server device facilitates overlay network communications in an underlay network environment. A database portion is configured to store information regarding overlay network devices within the underlay network environment. An overlay device management portion is configured to communicate with overlay devices and to provide operation information to the overlay devices. An underlay network communication portion is configured to communicate with at least one underlay network device at least to facilitate communications between a mobile station and a selected overlay device.

10 Claims, 1 Drawing Sheet

DEVICE FOR FACILITATING OVERLAY NETWORK OPERATION IN AN UNDERLAY NETWORK ENVIRONMENT

TECHNICAL FIELD

This invention generally relates to communications. More particularly, this invention relates to wireless communications using overlay network devices within an underlay network environment.

DESCRIPTION OF THE RELATED ART

Wireless communication systems are well known and in widespread use. Most systems allow subscribers to use mobile stations to conduct voice communications. In the recent past, more features have become available such as data communications along with other enhanced capabilities of wireless communications systems. It has become desirable for many subscribers to be able to use their mobile station as a primary communication device. In many situations, it has not been possible to replace the line-based telephone system in a building because of an inability to achieve sufficient radio frequency communications from inside the building to wireless communication network equipment located outside. There are RF losses associated with signals trying to penetrate through walls, for example.

One proposal at expanding wireless communication capability is to provide signaling devices within buildings that allows an individual to use a mobile station in a more reliable manner whether the mobile station is inside or outside the building. For example, it has been proposed to use overlay devices such as base station router devices or picocell base station units (PCBSU) within buildings for interfacing between a mobile station and a wireless communication network so that a subscriber achieves reliable communications within a building. Another reason to consider such signaling devices is to support increased data rates with low interference generated for other mobiles. This is possible due to the much smaller path-loss to an overlay device as a result of the usually small distance to the mobile. This allows a more efficient use of the operator's frequency spectrum.

With a proliferation of such overlay devices, various challenges become apparent. One issue is how to render such devices easy to install for the average consumer. Traditionally, adding base stations to a wireless communication system has been a lengthy, expensive and labor-intensive process. Adding overlay devices within a macrocell can improve the spectrum utilization but to be feasible, must be simpler than what is now required to add base stations in the conventional manner. Traditional manual configuration techniques used in cellular communication systems are not practical for deploying a large number of overlay devices. Additionally, where multiple overlay devices are deployed, there typically will be low efficiency especially where technically inexperienced users are installing the overlay devices. This is because it is necessary to properly plan frequency use and power levels to achieve a desirable efficiency level. Without appropriate training or experience, the average consumer will not be able to accomplish that end.

The plug-and-play capabilities of wireless access devices used for 802.11 standard and Bluetooth protocols do not present the same complexities as when trying to install an overlay device within an underlay network coverage area. The 802.11 and Bluetooth type devices do not require much configuration during deployment because the standards for such devices have been designed to have interference mitigation abilities at the MAC layer. Additionally, the plug-and-play aspects of 802.11 and Bluetooth devices are limited to the air interface and do not include other aspects of deployment. The approaches used in those contexts are not suitable for installing overlay devices such as PCBSUs.

The generic access network controller (GANC) used in the generic access network system does provide interworking between a GSM underlay and an overlay using a different technology, such as an 802.11 access point. The GANC performs a tunneling function by translating the signals coming from a handset to make them appear to be coming from another GSM base station. Such tunneling from one access technology to another is not useful for assisting an automated configuration process of a wireless transmission aspect of the network. Accordingly, the GANC approach is not suitable for installing overlay devices such as PCBSUs.

It is desirable to facilitate installing and using new overlay devices in a manner that will render them easy to install and still accomplish the technical adjustments necessary to efficiently use the available spectrum.

SUMMARY

An exemplary device for facilitating overlay network communications includes a database portion configured to store information regarding overlay network devices within an underlay network environment. An overlay device management portion is configured to communicate with overlay devices and to provide operation information to the overlay devices. An underlay network communication portion is configured to communicate with at least one underlay network device at least to facilitate communications between a mobile station and a selected overlay device.

The various features and advantages of a disclosed example will become apparent to those skilled in the art from the following detailed description. The drawings that accompany the detailed description can be briefly described as follows.

DETAILED DESCRIPTION

Figure 1:
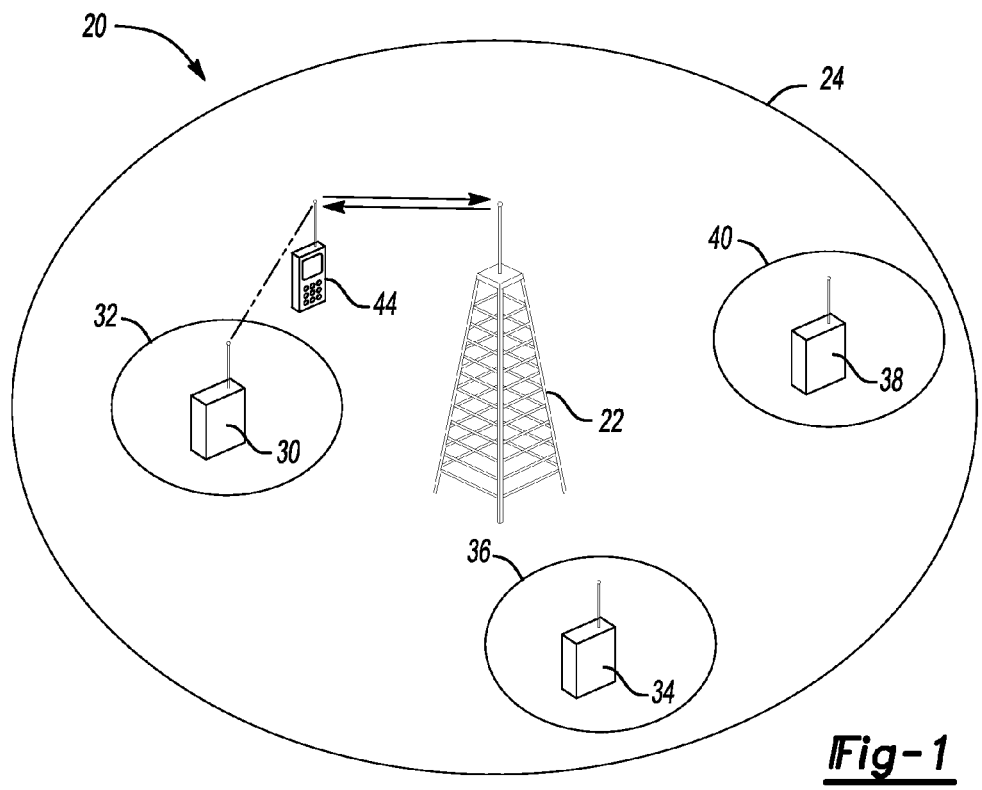
FIG. 1 schematically illustrates selected portions of a wireless communication system having overlay devices within a portion of an underlay network.
Figure 2:
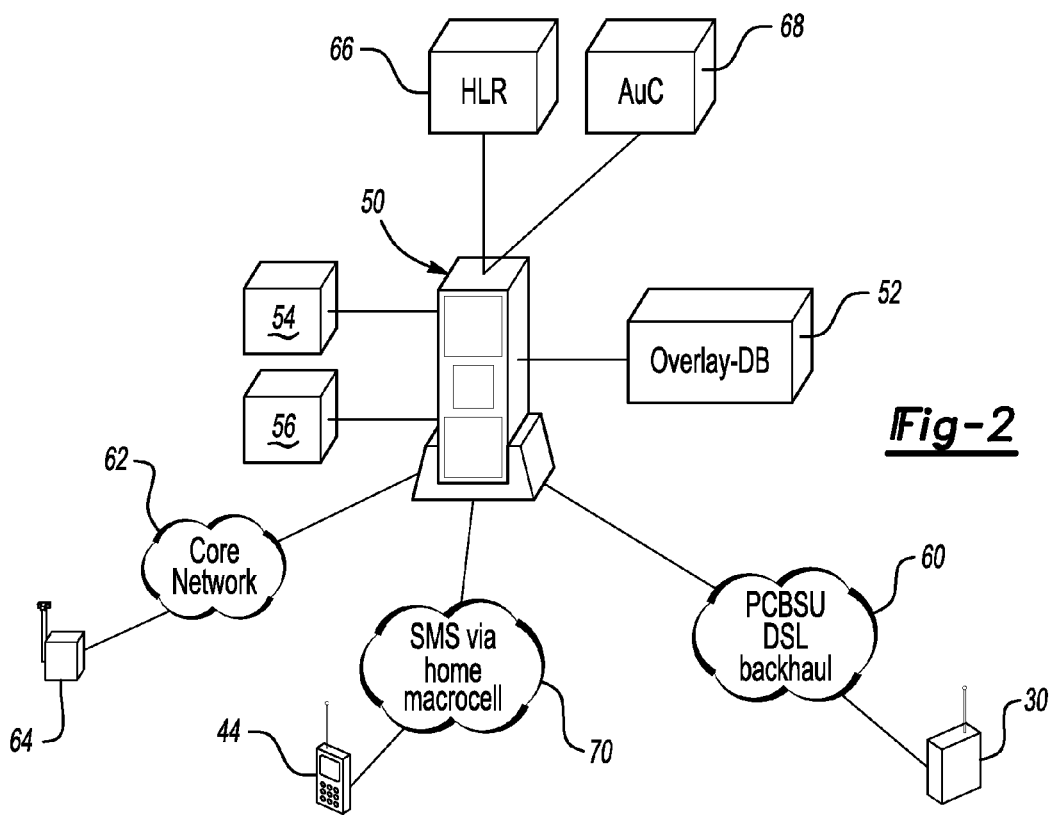
FIG. 2 schematically shows an example server device and associated functionality.

FIG. 1 schematically illustrates selected portions of a communication system 20. A base station 22 includes a base station transceiver unit and appropriate radio communication equipment for conducting wireless communications in a generally known manner. The base station 22 establishes a wireless communication coverage area 24 that is referred to as a macrocell for purposes of discussion. The geographic region of the macrocell 24 will depend on, in part, the capabilities of the base station 22 and the surrounding geography. There are known techniques for establishing a desired macrocell coverage area.

Within the macrocell 24, a picocell base station unit (PCBSU) 30 provides wireless communication coverage within a picocell 32. As can be appreciated from the illustration, the size of the coverage area of the picocell 32 is much smaller than that of the macrocell 24. The illustration is not to scale but the point is that the picocell coverage area of the picocell 32 is much smaller than that of the macrocell 24. In one example, the picocell 32 corresponds to the user's home.

Another PCBSU 34 provides wireless coverage within a picocell 36. Still another PCBSU 38 provides a picocell coverage area 40.

It is possible for a mobile station 44 within the macrocell 24 to communicate with the macrocell by communicating with the base station 22 in a known manner. When the mobile station 44 enters into a picocell area where that mobile station is authorized for communications within the picocell, it will be desirable to handover from the macrocell 24 to the corresponding picocell. In the illustrated example, the user of the mobile station 44 has rights for using the communication capabilities of the PCBSU 30 for communicating within the picocell 32.

The macrocell 24 and the base station 22 are considered part of an underlay network environment for purposes of discussion. The picocells 32, 36 and 40 are considered part of an overlay network because they are operating in a sense on top of or in addition to the underlay environment of the macrocell 24. The PCBSUs 30, 34 and 38 are considered overlay devices for purposes of discussion.

An overlay server device 50 facilitates overlay network communications within the underlay network environment by performing a variety of functions. In one example, an overlay server device 50 is installed as part of an existing cellular network. The example server device 50 is a centralized network entity that facilitates automated deployment of overlay devices and, in some examples, facilitates plug-and-play type installation and use of overlay devices. The example server device 50 can, therefore, be considered an automated system management entity.

The example overlay server device 50 includes a database portion 52, an overlay device management portion 54 and an underlay network communication portion 56. The database portion 52 includes information indicating various features or aspects of overlay devices. For example, the database portion 52 includes information regarding relationships between overlay devices such as PCBSUs and associated mobile stations or the subscribers who own or control the overlay devices.

The overlay device management portion 54 communicates with overlay devices over a backhaul connection schematically shown at 60. In one example, a line-based DSL backhaul connection is used for communications between the overlay server device 50 and various overlay devices such as the PCBSU 30. The overlay device management portion 54 facilitates automated installation and use of overlay devices.

The underlay network communication portion 56 communicates through a core network 62 with one or more underlay devices 64 such as radio network controllers or macrocell base stations. The underlay network communication portion 56 also has access to a home location register 66 and an authentication center 68 associated with the underlay network. As schematically shown at 70, the underlay network communication portion 56 also enables the overlay server device 50 to communicate with mobile stations 44 through an underlay macrocell link schematically shown at 70.

The overlay server device 50 utilizes the database portion 52 to maintain information that is useful for initializing, authenticating and configuring overlay devices such as the PCBSU 30. It also uses information in the database portion 52 to facilitate communications between the mobile station 44 and the PCBSU 30. Additionally, information from the database portion 52 facilitates mobile station handovers between the underlay network and an overlay picocell, for example.

During an initialization of an overlay device, the database portion 52 collects information regarding the subscriber or subscribers who are authorized to communicate with that overlay device. For example, a subscriber IMSI and IMEI are stored in relation to an identification of the overlay device. Information regarding the location (e.g., postal code) where the overlay device is installed is associated with a record regarding that device in the database portion 52. A cell code (e.g., UMTS scrambling code or CDMA PN offset or equivalent) will be allocated to the overlay device and the database portion 52 includes that information. In one example, the database portion 52 also includes information regarding the underlay network macrocell within which the overlay device is installed.

The database portion 52 also serves as a centralized relational database that is used by other network entities to enable or assist in performing various functions and services. For example, the database portion 52 relates an input of a subscriber's identification (e.g., IMSI) and returns information regarding the identification, location and configuration of a corresponding overlay device associated with that mobile subscriber. Relating such information and communicating it in this manner is useful, for example, to assist a radio network controller for locating an overlay device of a subscriber to initiate a handover between the overlay and underlay networks.

The database portion 52 and the overlay device management portion 54 are useful for automatically registering and authenticating new overlay devices or overlay devices that have been moved from one location to another, for example. In one example, the overlay server device 50 establishes relationships between a subscriber who owns or controls an overlay device, the subscriber's account and any mobile station that is authorized to communicate using that particular overlay device. Such information typically will not exist within the overlay device when it is originally provided by a manufacturer or supplier. After a particular subscriber attempts to install that device, however, it will be possible to associate such information with the overlay device. The overlay server device 50 automatically associates such information and stores it appropriately within the database portion 52.

For example, during an initial installation of the PCBSU 30, a unique identifier (e.g., a SIM or an IMEI equivalent) along with the relevant subscriber's information (e.g., postal code, mobile number, etc.) is relayed from the PCBSU 30 over the backhaul link 60 to the server device 50. The overlay device management portion 54 in one example is configured to automatically authenticate the overlay device and create a record relating all desired information regarding the device and the subscriber in the database portion 52. The home location register 66 is accessed to gather some such information for this process in one example.

Another feature of the example overlay device management portion 54 is that it allows the overlay server device 50 to automatically set certain operation parameters of an overlay device. For example, the database portion 52 includes information regarding the location of overlay devices in a vicinity of the PCBSU 30. The overlay device management portion 54 uses such information to allocate a cell code (e.g., UMTS scrambling code or CDMA PN offset) to the PCBSU 30. Using such information allows for intelligently allocating cell codes to avoid re-use of the same code within a certain geographic area. Additionally, the overlay device management portion 54 in one example allocates radio resource and frequency channels and sets transmit powers for the overlay device. Example operating parameters that can be automatically set include a cell code for the overlay device, a power level for transmissions between the overlay device and a mobile station, a power for pilot transmissions, an initial neighbor list configuration, an operating frequency, location and routing area codes, and a channel for use by the overlay device. In one example, the database portion 52 stores an indication of any such set parameters.

In addition to enabling the overlay server device 50 to communicate with underlay network elements such as a radio network controller, home location register and authentication center, the underlay network communication portion 56 facilitates communications between the overlay server device 50 and mobile stations. This is useful for example, to configure the mobile station 44 so that it will be able to communicate with the PCBSU 30. For example, the overlay device server 50 (i.e., the underlay network communication portion 56) provides information to the mobile station 44 regarding the PCBSU cell code and other information to facilitate the mobile station 44 locating the PCBSU 30 and to facilitate handovers between the underlay and overlay networks. In one example, the overlay server device 50 (i.e., the underlay network communication portion 56) provides software downloads such as Applets to a SIM of the mobile station 44 to provide functionality to the mobile station 44 to enable it to communicate with the PCBSU 30 and to facilitate other automated processes associated with functionality such as handing over between an underlay cell and an overlay device. In one example, Short Message Service communication protocols are used for such communications between the overlay server device 50 and the mobile station 44.

The disclosed example facilitates simplifying implementation of automated configuration methods for implementing overlay devices within an underlay network environment. In one example, the overlay server device 50 uses standard, existing interfaces associated with existing legacy equipment to extract required information and implement any instructions. The example overlay server device 50 automates a registration, authentication and configuration process for overlay devices. Additionally, it automates the process of reconfiguring a mobile station for facilitating communications between the mobile station and an overlay device. Additionally, the disclosed example provides a relational database that provides useful information regarding overlay devices for use by underlay network elements and other overlay devices as may be needed in a given situation.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A server device for facilitating overlay network communications, comprising
    a database portion configured to store information regarding overlay network devices within an underlay network environment;
    an overlay device management portion configured to facilitate at least one of registering and authenticating at least one overlay device and to provide operation information to the overlay device; and
    an underlay network communication portion configured to communicate with at least one underlay network device at least to facilitate communications between a mobile station and a selected overlay device, the underlay network communication portion being configured to communicate with the mobile station through an underlay macrocell link, the underlay network communication portion being configured to provide at least one software download to the mobile station for enabling the mobile station to selectively communicate with the selected overlay device.

2. The device of claim 1, wherein the database portion is configured to store information indicating a relationship between at least one overlay device and at least one mobile station authorized to communicate with the overlay device.

3. The device of claim 2, wherein the database portion is configured to determine a correspondence between an identifier of the mobile station and information regarding the at least one overlay device including at least one of a cell code, a location and a configuration of the overlay device.

4. A server device for facilitating overlay network communications, comprising
    a database portion configured to store information regarding overlay network devices within an underlay network environment;
    an overlay device management portion configured to configured to facilitate at least one of registering and authenticating at least one overlay device and to provide operation information to the overlay device; and
    an underlay network communication portion configured to communicate with at least one underlay network device at least to facilitate communications between a mobile station and a selected overlay device, the underlay network communication portion being configured to provide at least one software download to the mobile station for enabling the mobile station to selectively communicate with the selected overlay device, wherein the database portion and the communication portion are configured to assist an underlay radio network controller for conducting a handover between an underlay macrocell and an overlay picocell.

5. The device of claim 1, wherein the overlay device management portion is configured to facilitate at least one of registering and authenticating an overlay device.

6. The device of claim 5, wherein the overlay device management portion is configured to relate an identifier of the overlay device with an identifier of an associated mobile station and wherein the database portion is configured to store the related identifiers.

7. The device of claim 1, wherein the overlay device management portion is configured to automatically set at least one operating parameter of an overlay device, the at least one operating parameter including at least one of
    a cell code for the overlay device,
    a power level for transmissions between the overlay device and a mobile station,
    a power for pilot transmissions,
    an initial neighbor list configuration,
    an operating frequency,
    location and routing area codes, and
    a channel for use by the overlay device; and
    wherein the database portion is configured to store an indication of the at least one automatically configured parameter.

8. The device of claim 7, wherein the overlay device management portion is configured to automatically set the at least one operating parameter based on information in the database portion regarding other overlay devices in a vicinity of the overlay device.

9. A server device for facilitating overlay network communications, comprising
    a database portion configured to store information regarding overlay network devices within an underlay network environment;

an overlay device management portion configured to communicate with overlay devices configured to facilitate at least one of registering and authenticating at least one overlay device and to provide operation information to the overlay device; and an underlay network communication portion configured to communicate with at least one underlay network device at least to facilitate communications between a mobile station and a selected overlay device, the underlay network communication portion being configured to provide at least one software download to the mobile station for enabling the mobile station to selectively communicate with the selected overlay device, wherein the underlay network communication portion is configured to communicate through an underlay macrocell with the mobile station to provide information to a mobile station for enabling the mobile station to selectively communicate with a selected overlay device.

10. The device of claim 9, wherein the underlay network communication portion communicates with the mobile station through a short message service protocol.

\* \* \* \* \*